US012647530B1

(12) United States Patent

Vaishampayan et al.

(10) Patent No.: US 12,647,530 B1

(45) Date of Patent: Jun. 2, 2026

(54) DYNAMIC MESSAGING GROUP DISTRIBUTION AND MODIFICATION DURING AN EVENT

(71) Applicant: Amazon Technologies, Inc., Seattle, WA (US)

(72) Inventors: Sujay Vaishampayan, Seattle, WA (US); Salvatore Sorrentino, Dyer, IN (US); Kristofer R. McQueen, Sunnyvale, CA (US); Gary Zhong, Seattle, WA (US); Yu-Hsiang Cheng, Bothell, WA (US); Ryan Steven McHarg, Seattle, WA (US); Parth Rajesh Parekh, Milpitas, CA (US); Jingwen Yu, San Jose, CA (US); Himanshu Agarwal, Seattle, WA (US); David Witherspoon, Spokane, WA (US); Gabriel Mititelu, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 195 days.

(21) Appl. No.: 17/937,085

(22) Filed: Sep. 30, 2022

(51) Int. Cl.
*H04N 7/15* (2006.01)
*H04L 12/18* (2006.01)
(Continued)

(52) U.S. Cl.
CPC ......... *H04N 7/152* (2013.01); *H04L 12/1822* (2013.01); *H04L 12/1831* (2013.01); *H04L 51/04* (2013.01); *H04N 7/147* (2013.01)

(58) Field of Classification Search
CPC .... H04N 7/152; H04N 7/147; H04L 12/1822; H04L 12/1831; H04L 51/04
See application file for complete search history.

(56) References Cited

U.S. PATENT DOCUMENTS 11,792,467 B1 * 10/2023 Kumar ............. H04N 21/43076
709/231
2011/0058101 A1 * 3/2011 Earley ............. H04N 21/25891
348/E7.001

(Continued)

OTHER PUBLICATIONS

"Best practices for designing and using partition keys effectively"; webpage <https://docs.aws.amazon.com/amazondynamodb/latest/developerquide/bp-partition-key-design.html> with Sep. 27, 2002 capture date, retrieved from Internet Archive Wayback Machine <https://web.archive.org/web/20220927222859/https://docs.aws.amazon.com/amazondynamodb/latest/developerguide/bp-partition-key-design.html> on Jan. 31, 2024, Amazon Web Services; © 2022; 4 pages.

(Continued)

*Primary Examiner* — Maria El-Zoobi
(74) *Attorney, Agent, or Firm* — BakerHostetler

(57) ABSTRACT

First participant information may be received that is associated with a set of participants that participate in an event. The set of participants may be distributed, based at least in part on distribution criteria and the first participant information, across a plurality of messaging groups, to form a first participant distribution, wherein each messaging group of the plurality of messaging groups has a respective participant subset of the set of participants, and wherein messages sent by participants within the respective participant subset are delivered only to other participants within the respective participant subset. During the event, second participant information may be received associated with the set of participants. Also during the event, the first participant distribution may be modified, based at least in part on the distribution criteria and the second participant information, to form a modified participant distribution.

19 Claims, 10 Drawing Sheets

(51) Int. Cl.
    *H04L 51/04*     (2022.01)
    *H04N 7/14*     (2006.01)

(56)         References Cited

U.S. PATENT DOCUMENTS

| | | | |
|---|---|---|---|
| 2014/0229866 A1* | 8/2014 | Gottlieb | H04N 7/15 |
| | | | 709/204 |
| 2016/0198223 A1* | 7/2016 | Maluk | H04N 21/44218 |
| | | | 709/206 |
| 2018/0359293 A1* | 12/2018 | Faulkner | H04L 65/403 |
| 2019/0132405 A1* | 5/2019 | Song | H04L 51/043 |
| 2020/0274726 A1* | 8/2020 | Setteboun | G06Q 10/1093 |
| 2023/0101606 A1* | 3/2023 | Wu | H04N 21/4788 |
| | | | 348/14.09 |
| 2023/0239433 A1* | 7/2023 | Garg | H04L 12/1827 |
| | | | 348/14.09 |
| 2023/0379557 A1* | 11/2023 | Chandrashekar | H04N 21/4788 |
| 2023/0388601 A1* | 11/2023 | Panchaksharaiah | |
| | | | H04N 21/4788 |

OTHER PUBLICATIONS

"Using write sharding to distribute workloads evenly"; webpage <https://docs.aws.amazon.com/amazondynamodb/latest/developerquide/bp-partition-key-sharding.html> with Sep. 27, 2002 capture date, retrieved from Internet Archive Wayback Machine <https://web.archive.org/web/20220927222917/https://docs.aws.amazon.com/amazondynamodb/latest/developerguide/bp-partition-key-sharding.html> on Jan. 31, 2024, Amazon Web Services; © 2022; 2 pages.

"Channel—Amazon Chime"; webpage <https://docs.aws.amazon.com/chime/latest/APIReference/API_Channel.html> with Jun. 25, 2022 capture date, retrieved from Internet Archive Wayback Machine <https://web.archive.org/web/20220625024015/https://docs.aws.amazon.com/chime/latest/APIReference/API_Channel.html> on May 21, 2025, Amazon Web Services © 2022; 3 pages.

"ChennelMembership—Amazon Chime"; webpage </https://docs.aws.amazon.com/chime/latest/APIReference/API_ChannelMembership.html> with Jun. 25, 2022 capture date, retrieved from Internet Archive Wayback Machine <https://web.archive.org/web/20220625024015/https://docs.aws.amazon.com/chime/latest/APIReference/API_ChannelMembership.html>on May 21, 2025, Amazon Web Services © 2022; 3 pages.

* cited by examiner

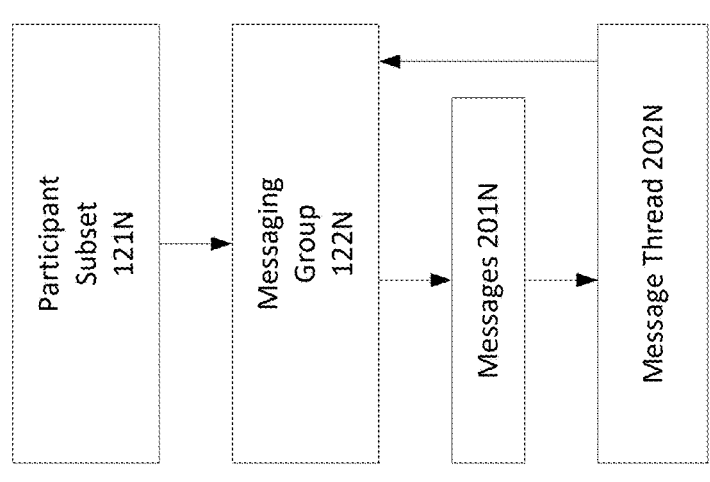
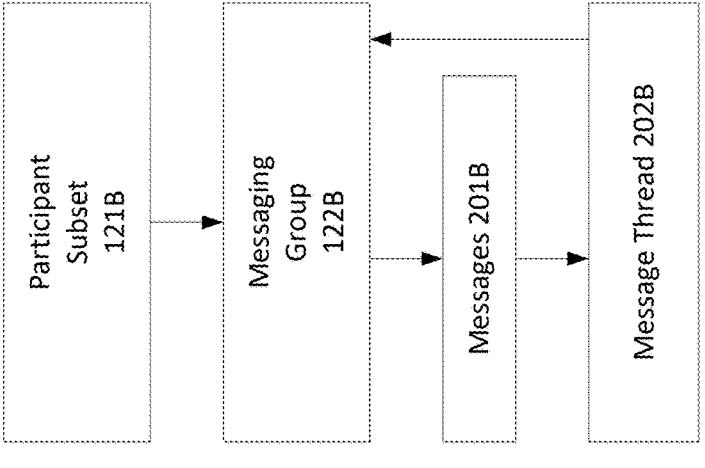
FIG. 2

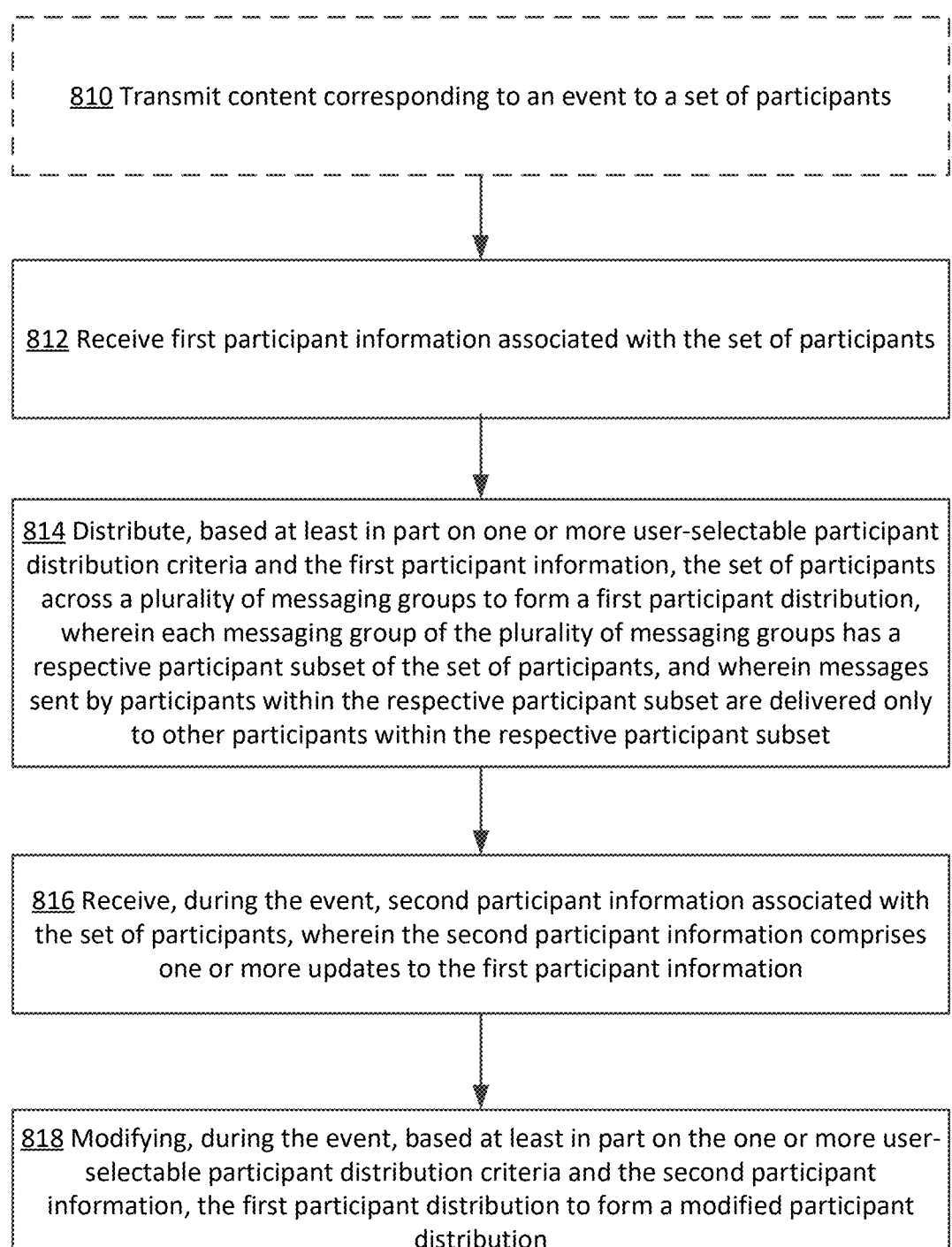

810 Transmit content corresponding to an event to a set of participants

812 Receive first participant information associated with the set of participants 814 Distribute, based at least in part on one or more user-selectable participant distribution criteria and the first participant information, the set of participants across a plurality of messaging groups to form a first participant distribution, wherein each messaging group of the plurality of messaging groups has a respective participant subset of the set of participants, and wherein messages sent by participants within the respective participant subset are delivered only to other participants within the respective participant subset 816 Receive, during the event, second participant information associated with the set of participants, wherein the second participant information comprises one or more updates to the first participant information 818 Modifying, during the event, based at least in part on the one or more user-selectable participant distribution criteria and the second participant information, the first participant distribution to form a modified participant distribution

DYNAMIC MESSAGING GROUP DISTRIBUTION AND MODIFICATION DURING AN EVENT

BACKGROUND

Many live events are transmitted to viewers and displayed in combination with messaging (e.g., chat) interfaces that allow viewers to compose, send, receive and view messages corresponding to the live events. When watching a live event being broadcasted, it is a richer experience for viewers if they can engage in a conversation with other viewers and voice their opinions or react to the actions as they take place in the broadcast. However, in large broadcast events, such as a football game or an e-sports tournament with millions of viewers, it may quickly become cumbersome to maintain a conversation due to the constant flood of messages in the chat window. For example, at the start of an event, a given viewer may be having a meaningful conversation with some other viewers. This conversation could then be interrupted either by another conversation or by other viewers simply sending messages as reactions to the ongoing event. Moreover, in large chat rooms, the ingress of messages may be so frequent that it results in endless scrolling of messages in the chat window. This can render a chat window unusable by viewers, thereby causing the viewers to lose interest in the event.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 2 is a diagram illustrating example separate message threads for different messaging groups that may be used in accordance with the present disclosure.

FIG. 8 is a flowchart illustrating an example dynamic messaging group distribution and modification process that may be used in accordance with the present disclosure.

DETAILED DESCRIPTION

Figure 1:
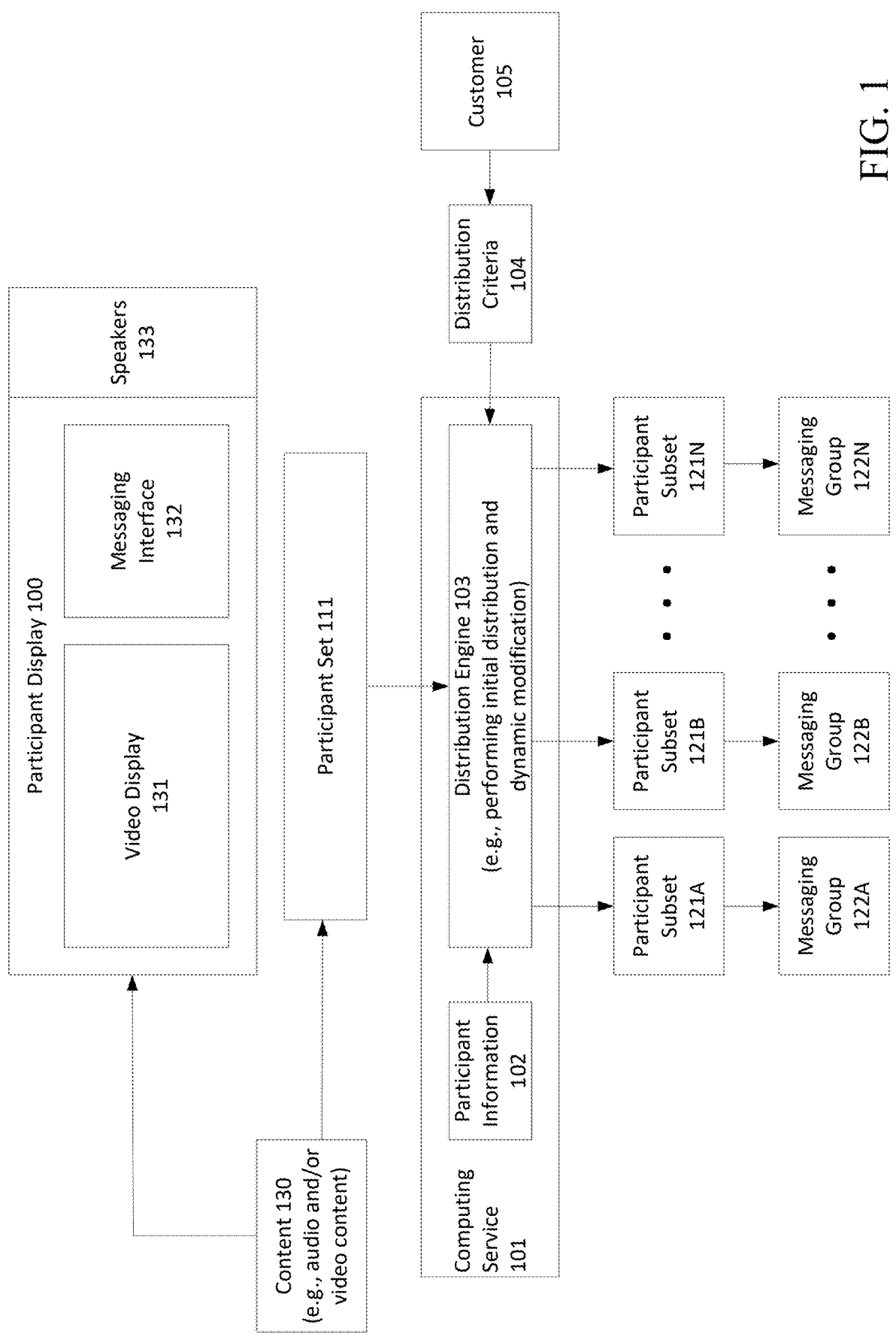
FIG. 1 is a diagram illustrating an example dynamic messaging group distribution and modification system that may be used in accordance with the present disclosure.

Techniques for dynamic messaging group distribution and modification during an event are described herein. The described techniques may be performed in connection with a set of participants that participate in an event, such as by composing, sending, receiving, reading and/or responding to messages (e.g., chat messages) associated with an event. One example of an event is a broadcast transmission of content (e.g., audio and/or video content) and corresponding messaging interactions (e.g., discussion, commentary, etc.) that correspond to the content transmission. For example, an event may include a broadcast of sporting event, video game and/or entertainment event (e.g., speed dating) and corresponding messaging interactions. The term event, as used herein, refers to a set of interactions among a set of participants.

A participant, as that term is used herein, refers to a user that participates in an event, such as by operating a device that sends and/or receives messages associated with the event. It is noted that there may be a wide variation in activity levels among event participants. For example, some participants may participate at high activity levels, such as by frequently reading, composing and/or sending messages associated with the event. By contrast, other participants may only occasionally read, compose and/or send messages associated with the event. It is noted that there is no requirement that a participant must have any specific level of activity relative to an event. In some examples, a low activity participant may merely operate a device that receives messages associated with an event, without necessarily reading or responding to any messages.

For scenarios in which an event includes a transmission of content (e.g., audio and/or video content), the content corresponding to the event may be transmitted to a set of participants. The content may be transmitted and played using streaming techniques, in which portions of transmitted content are received and played while subsequent portions of the transmitted content are being transmitted. In some examples, the content may be live streaming content. The term live streaming, as used herein, refers to scenarios in which content corresponding an event (e.g., a video game, a sporting event, a news or entertainment event, etc.) may be transmitted to participants, and at least part of the content may be played while the event is still occurring (e.g., while the video game is still being played by the players), albeit potentially with some small amounts latency between the time that content is captured and the time that the content is eventually played to participants. In combination with presentation of the content, a messaging interface, such as a chat window, may be displayed to participants. The messaging interface may allow participants to compose, send, receive and view messages corresponding to the event. For example, the messaging interface may allow participants to provide commentary, and discussion with other participants, regarding actions within the event as those actions occur.

According to the techniques described herein, participants in the event may be automatically distributed across a plurality of messaging groups. Specifically, the set of participants may be divided into a plurality of participant subsets, and each messaging group may correspond to a respective participant subset of the plurality of participant subsets. When a given participant within a given messaging group sends a message, the message may be delivered only to other participants within the same messaging group as the given participant. Thus, each messaging group may have its own unique thread of messages that may not be visible to participants in other groups. In this way, a customer can host a live event with chat for a large quantity of participants, such as more than a million participants, and ensure that the participants have meaningful conversations rather than simply be overwhelmed by the number of messages in chat. For live events such as speed dating or sports that need matchmaking, this can serve as a privacy mechanism so that other teams/matches are not aware of the details of conversations happening in other groups. By sectioning participants into multiple messaging groups, the participants may maintain context when having a conversation with other participants and avoid flooding the messaging feed with endless new messages. This feature of dividing participants into groups may be transparent to the participants. For example, it may appear to each participant as if he or she has simply joined the event itself, and the participants may be unaware that multiple messaging groups are assigned to the event.

In some examples, participants may be distributed across messaging groups at the start of an event (e.g., at the start of a content transmission). Additionally, in some examples, the distribution of participants across messaging groups may be dynamically modified during the event (e.g., during the transmission of the content). Modifying of the distribution of participants may include, for example, assigning new participants to messaging groups as those participants join the event in-progress, moving existing participants from one messaging group to another, generating new messaging groups during the event, removing existing messaging groups during the event, and other modifications. As will be described in detail below, both an initial distribution of participants across messaging groups, as well as any distribution modifications, may be performed based at least in part on participant information and distribution criteria.

The initial participant distribution and dynamic distribution modifications may be performed automatically by a computing service, such as a conferencing service, a messaging service, a video streaming service, and the like. Thus, event organizers (e.g., moderators) do not need to balance users between these groups, as the computing service may do this automatically for them. The participant distribution and modifications may be performed based in part on one or more user-selectable criteria, such as may be selected by customers of the computing service. These user-selectable criteria may include for example, a maximum quantity of participants per messaging group, a minimum quantity of participants per messaging group, a maximum quantity of messaging groups, a minimum quantity of messaging groups, a minimum time in group setting, participant preferences (e.g., tags), activity-based criteria, and other criteria. In some examples, customers may configure groups to have as few as two members each, for example to support events such as speed dating or dynamic matchmaking for sporting events.

Also, in some examples, customers may define activity-based criteria, such as a rate of message transmission within each messaging group, tracking whether a participant has an active message delivery destination (e.g., websocket connection), tracking when a participant last read messages (e.g., via scrolling to the bottom of a messaging interface), tracking whether a messaging interface is currently in focus on a participant device, and the like. These different criteria may be weighted. For example, some criteria may have a higher contribution than other criteria to determine if a group is active or inactive. In some examples, the criteria may be weighted based on corresponding time delays. For example, a participant that sent a message two minutes ago may be considered to be more active than a participant that sent a message ten minutes ago.

Before and during the event, the computing service may receive, update and monitor participant information associated with the event. The participant information may include, for example, a total quantity of participants at any given time, a quantity of participants within each messaging group at any given time, a quantity of participants that are leaving and/or joining the event at any given time, a total quantity of messaging groups at any given time, a listing of participants within each messaging group at any given time, participant preferences (e.g., tags), and the like. The participant information may also include tracked activity information, such as a rate of message transmission (e.g., per-messaging group and/or per-participant), message transmission times/ages, information tracking whether a participant has an active message delivery destination (e.g., websocket connection), information tracking when a participant last read messages (e.g., via scrolling to the bottom of a messaging interface), information tracking whether a messaging interface is currently in focus on a participant device, and the like.

The computing service may then dynamically modify the participant distribution based on the distribution criteria and the participant information. For example, a customer can specify a maximum quantity of participants per messaging group, and the service may automatically assign new participants to a group that is below the maximum limit. If new participants join the transmission and all messaging groups are at maximum threshold capacity, the computing service may automatically scale-out by creating a new messaging group and assigning participants to the new group. Additionally, if participants leave during the event, and a quantity of participants in a messaging group drops below a minimum threshold, the computing service may transfer participants from other messaging groups and/or scale-in the quantity of messaging groups to maintain a minimum threshold participant quantity in each messaging group. Customers may be provided with an option to have the computing service retain messages for all groups once the transmission has ended to perform sentiment analysis or any other kind of data analytics.

Also, during the lifetime of the event, the service may dynamically assess each messaging group to determine its activity level. The service may then balance users between more-active and less-active groups to ensure participants are constantly engaged. For example, the computing service may monitor the rate at which participants invoke a service application programming interface (API) to send messages (optionally on a per-user per-group basis). If a given group falls below a messaging rate threshold, active users from other groups may be moved to the inactive group to help stimulate conversations. The computing service may also track which participants in a group have an active message delivery destination (e.g., websocket connection) or track when a participant last read messages in a group (e.g., via scrolling to the bottom of a messaging interface) to determine the activity level of a group and then make a decision to balance participants across groups.

In some examples, a given user, such as a moderator and/or host of an event, may want to communicate with all participants across all messaging groups. For example, a musician, celebrity, or a politician may host a live event and may want to be able to communicate with all event participants. In these and other scenarios, the computing service may allow the host (and/or other users) to send an event-wide message that is transmitted across all messaging groups (or to a specific selected subset of messaging groups). In some examples, a given participant within a given messaging group may send a return message to the host. The host may then optionally respond to the given participant. In this scenario, the host's response message to the given participant may optionally be sent only to the given participant's messaging group (rather than broadcasting the message to all message groups). The computing service may keep track of the location of the given participant. Thus, even if the given participant is transferred to another messaging group, the computing service may find the location of the participant and send the response message to the participant's current messaging group.

FIG. 1 is a diagram illustrating an example dynamic messaging group distribution and modification system that may be used in accordance with the present disclosure. It is noted that FIG. 1 relates to an example in which an event includes a transmission of content 130 (e.g., audio and/or video content). The term event, as used herein, refers to a set of interactions among a set of participants. Thus, the term event, as used herein, is not limited to broadcast transmission of audio and/or video content. For example, an event may include any set of interactions (e.g., discussion, commentary, etc.) among a set of participants, regardless of whether those interactions are tied to a specific broadcast or other content transmission. In the example of FIG. 1, the participants in participant set 111 may include users that receive the content 130 and send and/or receive messages associated with the content 130. However, in other examples, participants may not necessarily receive a content transmission. For example, in some cases, participants may participate in an event that is a merely set of interactions between participants (e.g., a discussion, conversation, etc.) that is not tied to a particular content transmission.

As shown in FIG. 1, content 130, such as audio and/or video content, may be transmitted to a participant set 111, which includes a plurality of participants. In the example of FIG. 1, the participants in the participant set 111 may be users to which the content 130 is displayed or otherwise presented. For example, for scenarios in which content 130 includes video content, the participants in participant set 111 may be viewers of the video content. The content 130 may correspond to an event, such as a sporting event, a news event, an entertainment event, a video game, and the like, along with corresponding discussion and commentary. The content 130 may be transmitted and played using streaming techniques, in which portions of the content 130 are received and played while subsequent portions of the content 130 are being transmitted. In some examples, the content 130 may be live streaming content.

As shown in FIG. 1, if the content 130 includes video content, the video content may be displayed in a video display 131, which may be included in a participant display 100. Participant display 100 may be displayed by one or more computing device operated by one or more participants of participant set 111. For scenarios in which content 130 includes audio content, the audio content may be played via one or more speakers 133. In the example of FIG. 1, participant display 100 also includes a messaging interface 132, such as a chat window. The messaging interface 132 may allow participants to compose, send, receive and view messages (e.g., chat messages) corresponding to the content 130. For example, the messaging interface 132 may allow participants to provide commentary, and discussion with other participants, regarding actions within the event as those actions occur.

As also shown in FIG. 1, a computing service 101 may operate distribution engine 103. The computing service 101 may be, for example, a video streaming service, a messaging service and/or a conferencing service, for example that transmits content 130 and/or corresponding messages to participant set 111. As shown, the distribution engine 103 may distribute the participant set 111 across a plurality of messaging groups 122A-N. Specifically, distribution engine 103 may divide the participant set 111 into a plurality of participant subsets 121A-N, and each messaging group 122A-N may correspond to a respective participant subset 121A-N. When a given participant within a messaging group 122A-N sends a message, the message may be delivered only to other participants within the same messaging group 122A-N as the given participant. Thus, each messaging group 122A-N may have its own unique thread of messages that may not be visible to participants in other messaging groups 122A-N.

Referring now to FIG. 2, some examples of separate messaging threads for different messaging groups will be described in detail. As shown in FIG. 2, participants within participant subset 121A (corresponding to messaging group 122A) may generate and send messages 201A. Messages 201A may be displayed only within message thread 202A. Message thread 202A may be displayed only to messaging group 122A (e.g., displayed only to participant subset 121A). Thus, messages 201A may be transmitted only to messaging group 122A (e.g., transmitted only to participant subset 121A). As also shown in FIG. 2, participants within participant subset 121B (corresponding to messaging group 122B) may generate and send messages 201B. Messages 201B may be displayed only within message thread 202B. Message thread 202B may be displayed only to messaging group 122B (e.g., displayed only to participant subset 121B). Thus, messages 201B may be transmitted only to messaging group 122B (e.g., transmitted only to participant subset 121B). As also shown in FIG. 2, participants within participant subset 121N (corresponding to messaging group 122N) may generate and send messages 201N. Messages 201N may be displayed only within message thread 202N. Message thread 202N may be displayed only to messaging group 122N (e.g., displayed only to participant subset 121N). Thus, messages 201N may be transmitted only to messaging group 122N (e.g., transmitted only to participant subset 121N). For live events such as speed dating or sports that need matchmaking, this can serve as a privacy mechanism so that other teams/matches are not aware of the details of conversations happening in other groups. By sectioning participants into messaging groups 122A-N, participants may maintain context when having a conversation with other participants and avoid flooding the messaging feed with endless new messages. This feature of dividing participants into messaging groups 122A-N may be transparent to the participants. For example, it may appear to each participant as if he or she has simply joined the event itself, and the participants may be unaware that multiple messaging groups are assigned to the event.

Referring back to FIG. 1, it is shown that the distribution engine 103 may perform an initial distribution of the participants in participant set 111 across messaging groups 122A-N, for example at the start of the event (e.g., at the start of transmission of content 130). The distribution engine 103 may also dynamically modify the distribution of participants across messaging groups 122A-N during the event (e.g., during the transmission of the content 130). Modifying of the distribution of participants may include, for example, assigning new participants to messaging groups as those participants join the event in-progress, moving existing participants from one messaging group to another, generating new messaging groups during the event, removing existing messaging groups during the event, and other modifications. Thus, it is noted that the quantity and identities of participants within participant set 111 may change during the event. Additionally, the quantity of messaging groups 122A-N may change during the event. Furthermore, the quantities and identities of participants within each messaging group 122A-N may also change during the event. As will be described in detail below, both an initial distribution of participants across messaging groups 122A-N, as well as any distribution modifications, may be performed based at least in part on participant information 102 and distribution criteria 104.

Figure 3:
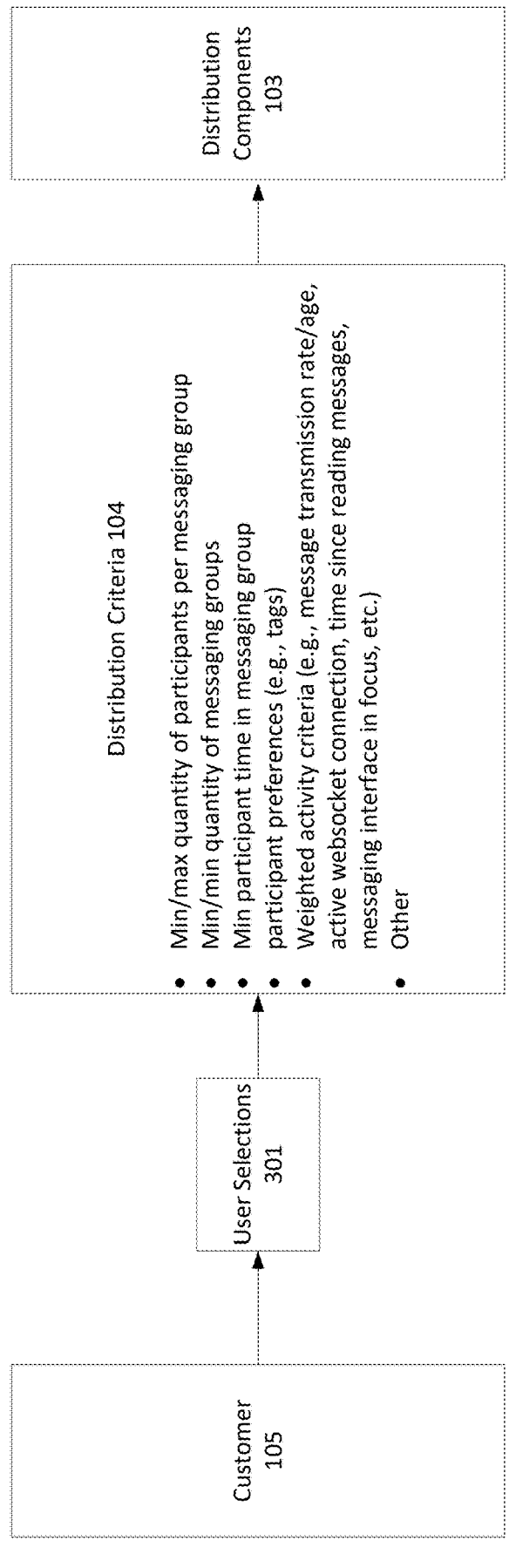
FIG. 3 is a diagram illustrating example distribution criteria selections that may be used in accordance with the present disclosure.

The computing service 101, via distribution engine 103, may automatically perform the initial participant distribution and dynamic distribution modifications. Thus, event organizers (e.g., moderators) do not need to balance participants between messaging groups 122A-N, as the computing service 101 may do this automatically for them. As shown, the participant distribution and modifications may be performed based in part on distribution criteria 104, which may include one or more user-selectable criteria, such as may be selected by a customer 105 of the computing service 101. Referring now to FIG. 3, it is shown that the distribution criteria 104 may be selected via one or more user selections 301 made by customer 105. The distribution criteria 104 may include for example, a maximum quantity of participants per messaging group, a minimum quantity of participants per messaging group, a maximum quantity of messaging groups, a minimum quantity of messaging groups, a minimum time in group setting, participant preferences (e.g., tags), activity-based criteria, and other criteria. In some examples, customer 105 may configure groups to have as few as two members each, for example to support events such as speed dating or dynamic matchmaking for sporting events.

In some examples, when joining a transmission of content 130, a participant may specify one or more preferences, such as one or more topics regarding which the participant may wish to participate in a discussion with other participants. In some examples, these preferences may be indicated via one or more tags, which may be stored by the computing service 101 in association with the participant. The tags may be used to help group participants that are interested in the same, or similar, topics into the same messaging group, such as to help stimulate meaning discussion between participants. The distribution criteria 104 may indicate whether, or not, the customer 105 wishes to have the participant preferences (e.g., tags) considered when distributing participants between messaging groups, as well as optionally a weight for how strongly the participant preferences should be considered.

In some cases, the user experience can be degraded if a given participant is frequently transferred between messaging groups. In this frequent transfer scenario, messages that are presented to the participant may constantly change, thereby preventing the participant from having meaningful conversations with other participants. In order to prevent this this frequent transfer scenario, the distribution criteria 104 may include a minimum time in group setting, which allows the customer 105 to specify a minimum time that a participant must be assigned to a given messaging group before the participant can be transferred to another messaging group. This configuration allows the participant to stay in the given messaging group for at least the selected minimum time, which prevents the participant from constantly bouncing around between messaging groups.

Also, in some examples, customers may define activity-based criteria, such as a rate of message transmission within each messaging group, tracking whether a participant has an active message delivery destination (e.g., websocket connection), tracking when a participant last read messages (e.g., via scrolling to the bottom of a messaging interface), tracking whether a messaging interface is currently in focus on a participant device, and the like. These different criteria may be weighted. For example, some criteria may have a higher contribution than other criteria to determine if a group is active or inactive. In some examples, the criteria may be weighted based on corresponding time delays. For example, a participant that sent a message two minutes ago may be considered to be more active than a participant that sent a message ten minutes ago.

In some examples, the computing service 101 may allow the customer 105 to change any, or all, of the distribution criteria 104 during the event (e.g., during the transmission of content 130). The computing service 101 may then automatically modify the distribution of participants, if necessary, based on the modified distribution criteria 104. For example, in some cases, customer 105 may want to increase the minimum quantity of participants per messaging group, such as to cause more messages to be sent more frequently in each messaging group. As another example, customer 105 may want to increase the maximum quantity of messaging groups, such as because the event may suddenly become more popular than expected.

Figure 4:
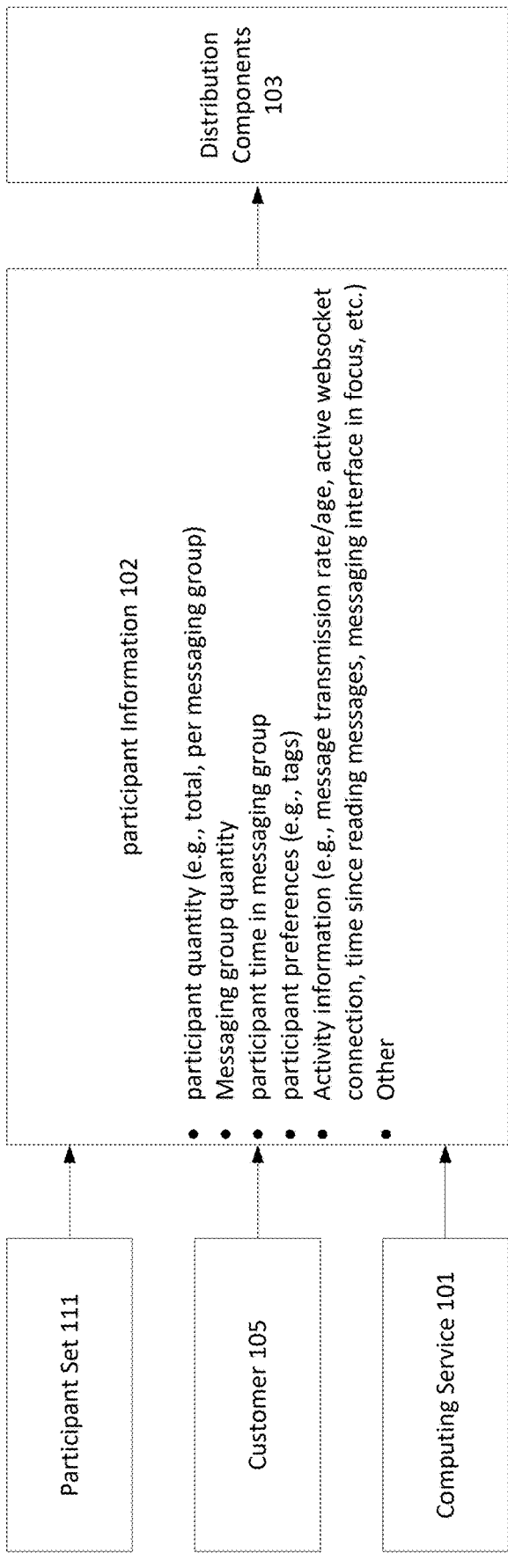
FIG. 4 is a diagram illustrating an example collection of participant information that may be used in accordance with the present disclosure.

Referring back to FIG. 1, it is shown that, before and during the event (e.g., the transmission of the content 130), the computing service 101 may receive, update and monitor participant information 102 associated with the transmission. The participant information 102 may include any information associated with one or more participants. Referring now to FIG. 4, it is shown that the participant information 102 may be obtained from a variety of sources, for example including participants in participant set 111 (e.g., via their corresponding client devices), from customer 105 and/or from computing service 101. The participant information 102 may include, for example, a total quantity of participants at any given time, a quantity of participants within each messaging group at any given time, a quantity of participants that are leaving and/or joining the event at any given time, a total quantity of messaging groups at any given time, a listing of participants within each messaging group at any given time, participant preferences (e.g., tags), and the like. The participant information 102 may also include tracked activity information, such as a rate of message transmission (e.g., per-messaging group and/or per-participant), message transmission times/ages, information tracking whether a participant has an active message delivery destination (e.g., websocket connection), information tracking when a participant last read messages (e.g., via scrolling to the bottom of a messaging interface), information tracking whether a messaging interface is currently in focus on a participant device, and the like.

In some examples, in order to send messages, participants may invoke an API of computing service 101 (e.g., a messaging service API). This may allow the computing service 101 to determine message transmission rates for the participants. Some other activity information may be provided by customer 105. For example, in some cases, customer 105 may send signals to computing service 101 to assist in determining participant activity levels. In some examples, only the customer 105, and not the computing service 101, may be capable of determining whether the messaging interface 132 is currently in focus in an application provided by the customer 105. In these scenarios, the customer 105 may periodically send a control message to the computing service 101, for each participant, that summarizes the activity level for that participant, such as whether the messaging interface 132 is currently in focus for that participant. The computing service 101 may then aggregate this information across participants for each messaging group and then determine a respective activity level for each messaging group.

The computing service 101, via distribution engine 103, may dynamically modify the participant distribution based on the distribution criteria 104 and the participant information 102. For example, customer 105 can specify a maximum quantity of participants per messaging group, and the computing service 101 may automatically assign new participants to a group that is below the maximum limit. If new participants join the event and all messaging groups are at maximum threshold capacity, the computing service 101 may automatically scale-out by creating a new messaging group and assigning participants to the new group. Additionally, if participants leave during the event, and a quantity of participants in a messaging group drops below a minimum threshold, the computing service 101 may transfer participants from other messaging groups and/or scale-in the quantity of messaging groups to maintain a minimum threshold participant quantity in each messaging group. Customer 105 may be provided with an option to have the computing service 101 retain messages for all groups once the event has ended to perform sentiment analysis or any other kind of data analytics.

Figure 5:
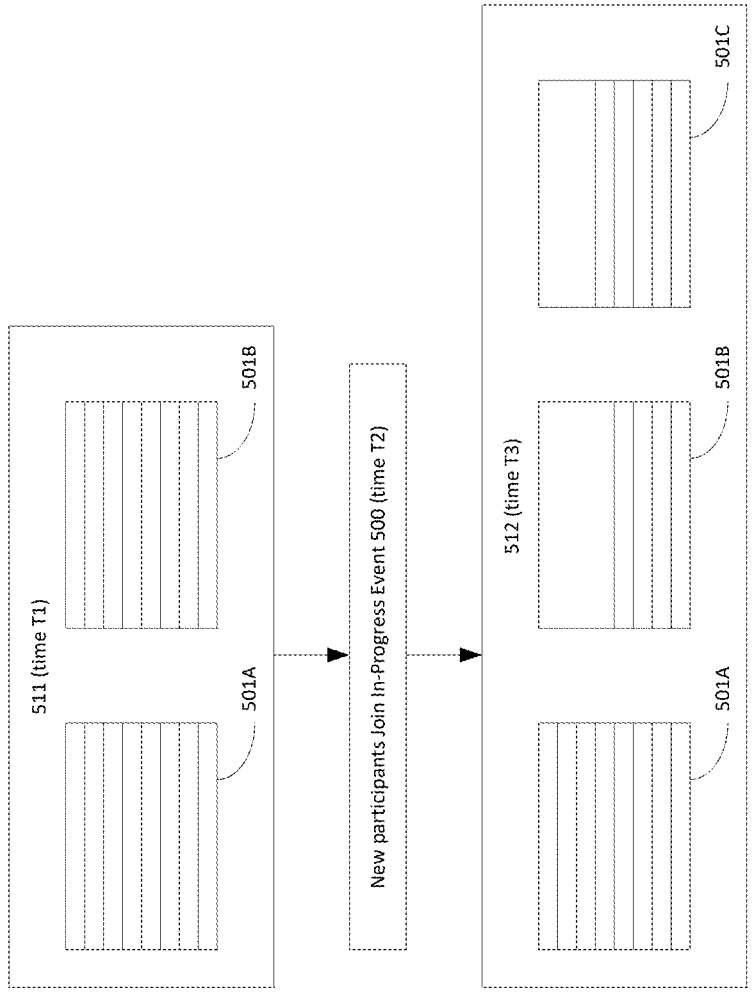
FIG. 5 is a diagram illustrating an example messaging group scale-out that may be used in accordance with the present disclosure.

Referring now to FIG. 5, an example messaging group scale-out will now be described in detail. In FIG. 5, the horizontal lines across messaging groups 501A-C represent a current quantity of participants within each messaging group 501A-C. As shown, distribution 511 is an example participant distribution at time T1. In this example, distribution 511 includes two messaging groups, which are messaging groups 501A and 501B. At time T1, both messaging groups 501A and 501B are completely full, meaning that the current quantity of participants in each messaging group 501A and 501B is equal to a selected maximum participant threshold for each messaging group 501A-B. The fullness of messaging groups 501A and 501B at time T1 is indicated by the horizontal lines that extend up the full vertical height of both messaging groups 501A and 501B in distribution 511.

At time T2, which occurs immediately after time T1, an action 500 occurs in which new participants join the in-progress event. Thus, in the example of FIG. 5, computing service 101 may determine that new participants are joining the event and all existing messaging groups (messaging groups 501A-B) are currently full. In this scenario, the computing service 101 may automatically scale-out by creating and adding a new messaging group (messaging group 501C). Specifically, in this example, at time T3, a modified distribution 512 is created that includes three messaging groups 501A-C. In this example, the participants that were formerly in messaging group 501B, at time T1, are evenly split between messaging group 501B and messaging group 501C. Additionally, the new participants that joined the event at time T2 are assigned to messaging group 501C (which is why there is one more horizontal line in messaging group 501C as compared to messaging group 501B at time T3). It is noted that FIG. 5 depicts only one example messaging group scale-out technique, and that a variety of other techniques may be employed.

Figure 6:
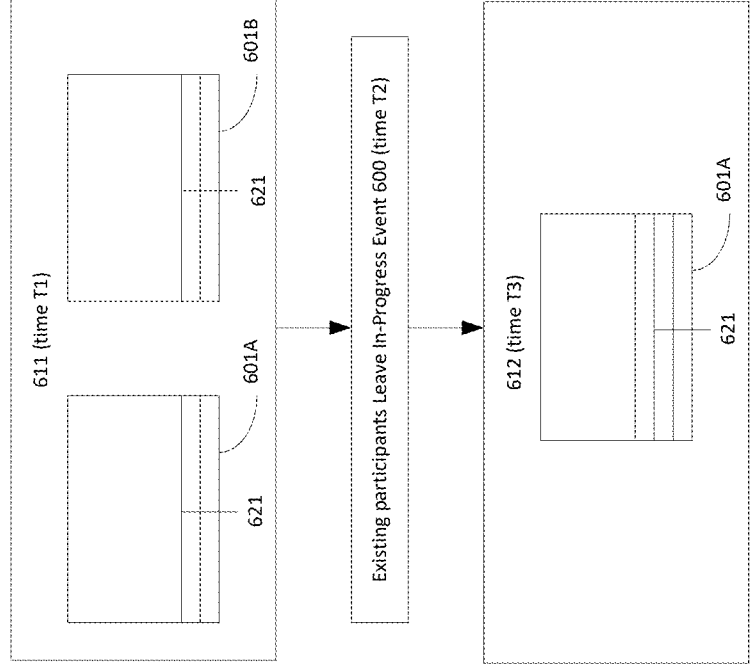
FIG. 6 is a diagram illustrating an example messaging group scale-in that may be used in accordance with the present disclosure.

Referring now to FIG. 6, an example messaging group scale-in will now be described in detail. In FIG. 6, the horizontal lines across messaging groups 601A-B represent a current quantity of participants within each messaging group 601A-B. Additionally, vertical line 621 indicates a selected minimum participant quantity for each messaging group 601A-B. As shown, distribution 611 is an example participant distribution at time T1. In this example, distribution 611 includes two messaging groups, which are messaging groups 601A and 601B. At time T1, both messaging groups 601A and 601B are at minimum capacity, meaning that the current quantity of participants in each messaging group 601A and 601B is equal to the selected minimum participant threshold. The minimum capacity of messaging groups 601A and 601B at time T1 is indicated by the horizontal lines that extend only up to the vertical height of vertical line 621 in both messaging groups 601A and 601B in distribution 611.

At time T2, which occurs immediately after time T1, an action 600 occurs in which existing participants leave the in-progress event. Thus, in the example of FIG. 6, computing service 101 may determine that existing participants are leaving the event and all existing messaging groups (messaging groups 601A-B) are currently at their minimum capacity. In this scenario, the computing service 101 may automatically scale-in by removing an existing messaging group (messaging group 601B). Specifically, in this example, at time T3, a modified distribution 612 is created that includes one messaging group 601A. In this example, the remaining participants that were formerly in messaging group 601B, at time T1, are transferred to messaging group 601A. It is noted that FIG. 6 depicts only one example messaging group scale-in technique, and that a variety of other techniques may be employed.

Also, during the lifetime of the event, the computing service 101 may dynamically assess each messaging group to determine its activity level. The computing service 101 may then balance users between more-active and less-active groups to ensure participants are constantly engaged. For example, the computing service 101 may monitor the rate at which participants invoke a service API to send messages (optionally on a per-user per-group basis). If a given group falls below a messaging rate threshold, active users from other groups may be moved to the inactive group to help stimulate conversations. The computing service 101 may also track which participants in a group have an active message delivery destination (e.g., websocket connection) or track when a participant last read messages in a group (e.g., via scrolling to the bottom of a messaging interface) to determine the activity level of a group and then make a decision to balance participants across groups.

Figure 7:
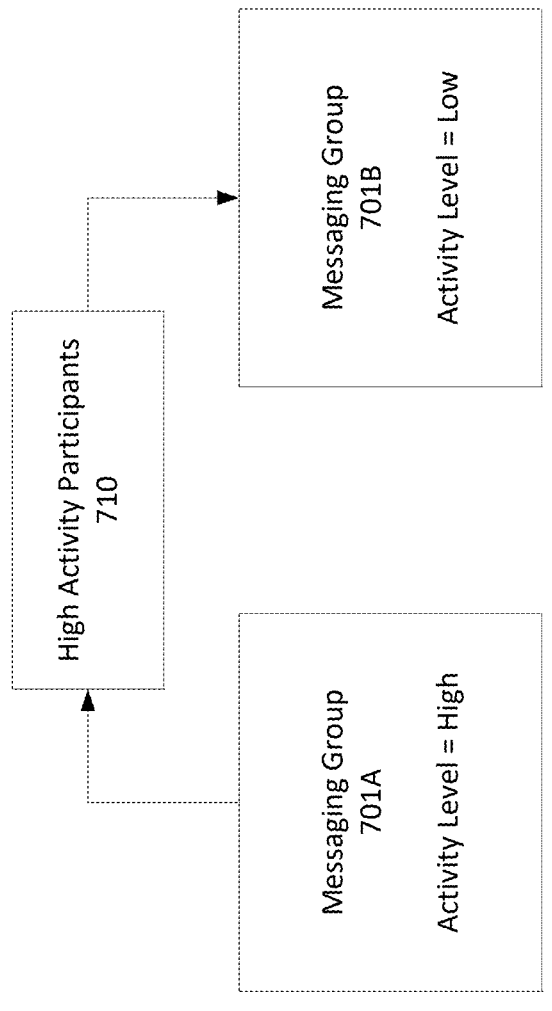
FIG. 7 is a diagram illustrating an example activity-based distribution modification that may be used in accordance with the present disclosure.

Referring now to FIG. 7, an example activity-based distribution modification will now be described in detail. In the example of FIG. 7, computing service 101 may determine that messaging group 701A has a high activity level. This means that, in general, the participants included in messaging group 701A have a high activity level. For example, participants within messaging group 701A may be frequently composing and sending messages, frequently reading messages, or otherwise actively engaged with one another. As described above, this may be determined, for example, based on a high message transfer rate within messaging group 701A, by determining that a high percentage of participants within messaging group 701A have an active message delivery destination (e.g., websocket connection), by determining that a high percentage of participants within messaging group 701A have recently scrolled to the bottom of a messaging interface (e.g., indicating that they have read messages), by determining that a high percentage of participants within messaging group 701A have a messaging interface that is currently in focus on a participant device, and the like.

By contrast, computing service 101 may determine that messaging group 701B has a low activity level. This means that, in general, the participants included in messaging group 701B have a low activity level. For example, participants within messaging group 701B may not be frequently composing and sending messages, may not be frequently reading messages, or may otherwise not be actively engaged with one another. As described above, this may be determined, for example, based on a low message transfer rate within messaging group 701B, by determining that a low percentage of participants within messaging group 701B have an active message delivery destination (e.g., websocket connection), by determining that a low percentage of participants within messaging group 701B have recently scrolled to the bottom of a messaging interface (e.g., indicating that they have read messages), by determining that a low percentage of participants within messaging group 701B have a messaging interface that is currently in focus on a participant device, and the like.

In the example of FIG. 7, in order to help balance the activity level of participants across messaging groups 701A and 701B, the computing service 101 may, at action 710, transfer one or more high activity participants from messaging group 701A to 701B. This may have the effect of helping to stimulate conversation and interaction in messaging group 701B, so that the activity level of messaging group 701B can be increased. For example, the computing service 101 may identify one or more of participants within messaging group 701A that most frequently compose and transmit messages. The computing service 101 may then move these high activity participants to messaging group 701B to help stimulate conversation and interaction in messaging group 701B.

In some cases, the engagement levels of messaging groups may be highly dependent on the participants, and the customer 105 may be unable to predict the engagement levels from the participants. For some large events, the participants may be mostly inactive. For example, each messaging group may have one-thousand participants, but only a tiny fraction of the participants may send messages. By contrast, for other large events, the participants may be extremely active, and a significant number of participants may send large numbers of messages. The customer 105 may define the engagement level configuration. The computing service 101 may then automatically scale-out or scale-in to rebalance the messaging groups to meet the configuration based on the signals captured in the group. For example, for a transmission with a large number of inactive participants, the computing service 101 may automatically increase the minimum quantity of participants per messaging group, for example from one-thousand to ten-thousand. The computing service 101 may then automatically scale-in the number of messaging groups (e.g., by removing some messaging groups and transferring their participants to other messaging groups) so that each messaging group has at least ten-thousand participants. With more participants in each remaining messaging group, the engagement level should be higher.

By contrast, for an event with a large number of active participants, there may be too many messages being sent too quickly within each messaging group. In this scenario, the computing service 101 may automatically decrease the maximum quantity of participants per messaging group, for example from six-hundred to two-hundred. This may cause the number of participants per messaging group to decrease, which may have the effect of allowing messages to be sent at a slower rate within each messaging group, thereby giving participants sufficient time to read the messages. This rebalancing may also reduce costs for the customer 105. For example, one messaging group with six-hundred participants sending one-hundred-eighty messages per minute may cost more to operate than three messaging groups that each have two-hundred participants sending sixty messages per minute. This is because, in the large messaging group fan, each message is delivered to six-hundred participants. By contrast, in the small messaging group fan, each message is delivered to only two-hundred participants.

FIG. 8 is a flowchart illustrating an example dynamic messaging group distribution and modification process that may be used in accordance with the present disclosure. In some examples, any, or all, of operations 810-818 of FIG. 8 may be performed by computing service 101 of FIG. 8, which may be, for example, a video streaming service, a messaging service and/or a conferencing service. The process of FIG. 8 is initiated at operation 810, at which content corresponding to an event, such as content 130 of FIG. 1, is transmitted to a set of participants. As described above, content 130, such as audio and/or video content, may be transmitted to a participant set 111, which includes a plurality of participants. The participants in the participant set 111 may be users to which the content 130 is displayed or otherwise presented. For example, for scenarios in which content 130 includes video content, the participants in participant set 111 may be viewers of the video content. The content 130 may correspond to an event, such as a sporting event, a news event, an entertainment event, a video game, and the like. The content 130 may be transmitted and played using streaming techniques. In some examples, the content 130 may be live streaming content. Thus, operation 810 may be performed in scenarios when an event includes, or is otherwise tied to, a transmission of content. As described above, however, an event is not necessarily required to include, or otherwise be tied to, a specific transmission of content. For example, in some cases, the set of participants may participate in an event that is a merely set of interactions between participants (e.g., a discussion, conversation, etc.) that is not tied to any particular content transmission. For scenarios in which an event is not tied to a particular content transmission, operation 810 may be skipped, and operation 810 is therefore shown in FIG. 8 using dashed lines.

At operation 812, first participant information associated with the set of participants is received. As described above, the set of participants may participate in the event. The first participant information may include one or more initial and/or updated collections of participant information 102. As described above with reference to FIG. 1, before and during the event (e.g., the transmission of the content 130), the computing service 101 may receive, update and monitor participant information 102 associated with the event. The participant information 102 may include any information associated with one or more participants. As described above with reference to FIG. 4, the participant information 102 may be obtained from a variety of sources, for example including participants in participant set 111 (e.g., via their corresponding client devices), from customer 105 and/or from computing service 101. The first participant information may include, for example, a total quantity of participants at any given time (e.g., a total quantity of participants in the participant set 111 at any given time), a quantity of participants within each messaging group at any given time, a quantity of participants that are leaving and/or joining the event at any given time, a total quantity of messaging groups at any given time, a listing of participants within each messaging group at any given time, participant preferences (e.g., tags), and the like. The first participant information may also include participant activity information indicating an activity level of one or more participants. The participant activity information may include tracked activity information, such as a rate of message transmission (e.g., per-messaging group and/or per-participant), message transmission times/ages, information tracking whether a participant has an active message delivery destination (e.g., websocket connection), information tracking when a participant last read messages (e.g., via scrolling to the bottom of a messaging interface), information tracking whether a messaging interface is currently in focus on a participant device, and the like.

At operation 814, the set of participants is distributed across a plurality of messaging groups, based at least in part on one or more user-selectable participant distribution criteria and the first participant information, to form a first participant distribution, wherein each messaging group of the plurality of messaging groups has a respective participant subset of the set of participants, and wherein messages sent by participants within the respective participant subset are delivered only to other participants within the respective participant subset. In some examples, operations 812 and 814 may be performed at, or in close time proximity to, the initiation of the event (e.g., the initiation of the transmission of the content). As described above with reference to FIG. 1, the distribution engine 103 may distribute the participant set 111 across a plurality of messaging groups 122A-N. Specifically, distribution engine 103 may divide the participant set 111 into a plurality of participant subsets 121A-N, and each messaging group 122A-N may correspond to a respective participant subset 121A-N. When a given participant within a messaging group 122A-N sends a message, the message may be delivered only to other participants within the same messaging group 122A-N as the given participant. Thus, each messaging group 122A-N may have its own unique thread of messages that may not be visible to participants in other messaging groups 122A-N.

The computing service 101, via distribution engine 103, may automatically perform the initial participant distribution and dynamic distribution modifications based at least in part on participant information 102 and distribution criteria 104. Thus, event organizers (e.g., moderators) do not need to balance participants between messaging groups 122A-N, as the computing service 101 may do this automatically for them. Distribution criteria 104 may include one or more user-selectable criteria, such as may be selected by a customer 105 of the computing service 101. As described above with reference to FIG. 3, the distribution criteria 104 may be selected via one or more user selections 301 made by customer 105. The user-selectable distribution criteria may include for example, a maximum participant quantity per messaging group, a minimum participant quantity per messaging group, a maximum messaging group quantity, a minimum messaging group quantity, or a minimum time in messaging group, an indication of whether to consider participant preferences (e.g., tags), and other criteria. In some examples, the user-selectable distribution criteria may also include weighted activity criteria relating to participant activity levels, such as a rate of message transmission within each messaging group, tracking whether a participant has an active message delivery destination (e.g., websocket connection), tracking when a participant last read messages (e.g., via scrolling to the bottom of a messaging interface), tracking whether a messaging interface is currently in focus on a participant device, and the like. These different criteria may be weighted. For example, some criteria may have a higher contribution than other criteria to determine if a group is active or inactive. In some examples, the criteria may be weighted based on corresponding time delays. For example, a participant that sent a message two minutes ago may be considered to be more active than a participant that sent a message ten minutes ago.

At operation 816, second participant information associated with the set of participants is received during the event (e.g., during the transmitting of the content), wherein the second participant information comprises one or more updates to the first participant information. Thus, the second participant information may include one or more updated collections of participant information 102. As described above with reference to FIG. 1, before and during the event, the computing service 101 may receive, update and monitor participant information 102 associated with the transmission. The participant information 102 may include any information associated with one or more participants. As described above with reference to FIG. 4, the participant information 102 may be obtained from a variety of sources, for example including participants in participant set 111 (e.g., via their corresponding client devices), from customer 105 and/or from computing service 101. The second participant information may include, for example, a total quantity of participants at any given time (e.g., a total quantity of participants in the participant set 111 at any given time), a quantity of participants within each messaging group at any given time, a quantity of participants that are leaving and/or joining the event at any given time, a total quantity of messaging groups at any given time, a listing of participants within each messaging group at any given time, participant preferences (e.g., tags), and the like. The second participant information may also include participant activity information indicating an activity level of one or more participants. The participant activity information may include tracked activity information, such as a rate of message transmission (e.g., per-messaging group and/or per-participant), message transmission times/ages, information tracking whether a participant has an active message delivery destination (e.g., websocket connection), information tracking when a participant last read messages (e.g., via scrolling to the bottom of a messaging interface), information tracking whether a messaging interface is currently in focus on a participant device, and the like.

At operation 818, the first participant distribution is modified, during the event (e.g., during the transmitting of the content), to form a modified participant distribution. The first participant distribution is modified based at least in part on the one or more user-selectable participant distribution criteria and the second participant information. As described above with reference to FIG. 1, the distribution engine 103 may dynamically modify the distribution of participants across messaging groups 122A-N during the event (e.g., during the transmission of the content 130). As described in detail below, modifications to the distribution of participants across messaging groups 122A-N may be performed based at least in part on participant information 102 and distribution criteria 104. The modifying of the first participant distribution may include at least one of adding a new participant to a first messaging group or moving an existing participant from a first messaging group to a second messaging group. For example, the modifying of the first participant distribution may include moving an existing participant from the first messaging group to the second messaging group based at least in part on an activity level of the existing participant (e.g., as described above with reference to FIG. 7). Also, in some examples, the modifying of the first participant distribution may include at least one of adding a new messaging group to the plurality of messaging groups (e.g., as described above with reference to FIG. 5) or removing an existing messaging group from the plurality of messaging groups (e.g., as described above with reference to FIG. 6). The modifying of the first participant distribution may also include removing a participant from a messaging group when the participant leaves the in-progress event.

As described above, customer 105 can specify a maximum quantity of participants per messaging group, and the computing service 101 may automatically assign new participants to a group that is below the maximum limit. If new participants join the event and all messaging groups are at maximum threshold capacity, the computing service 101 may automatically scale-out by creating a new messaging group and assigning participants to the new group. Additionally, if participants leave during the event, and a quantity of participants in a messaging group drops below a minimum threshold, the computing service 101 may transfer participants from other messaging groups and/or scale-in the quantity of messaging groups to maintain a minimum threshold participant quantity in each messaging group.

As also described above, during the lifetime of the event, the computing service 101 may dynamically assess each messaging group to determine its activity level. The computing service 101 may then balance users between more-active and less-active groups to ensure participants are constantly engaged. For example, the computing service 101 may monitor the rate at which participants invoke a service API to send messages (optionally on a per-user per-group basis). If a given group falls below a messaging rate threshold, active users from other groups may be moved to the inactive group to help stimulate conversations. The computing service 101 may also track which participants in a group have an active message delivery destination (e.g., websocket connection) or track when a participant last read messages in a group (e.g., via scrolling to the bottom of a messaging interface) to determine the activity level of a group and then make a decision to balance participants across groups.

Figure 9:
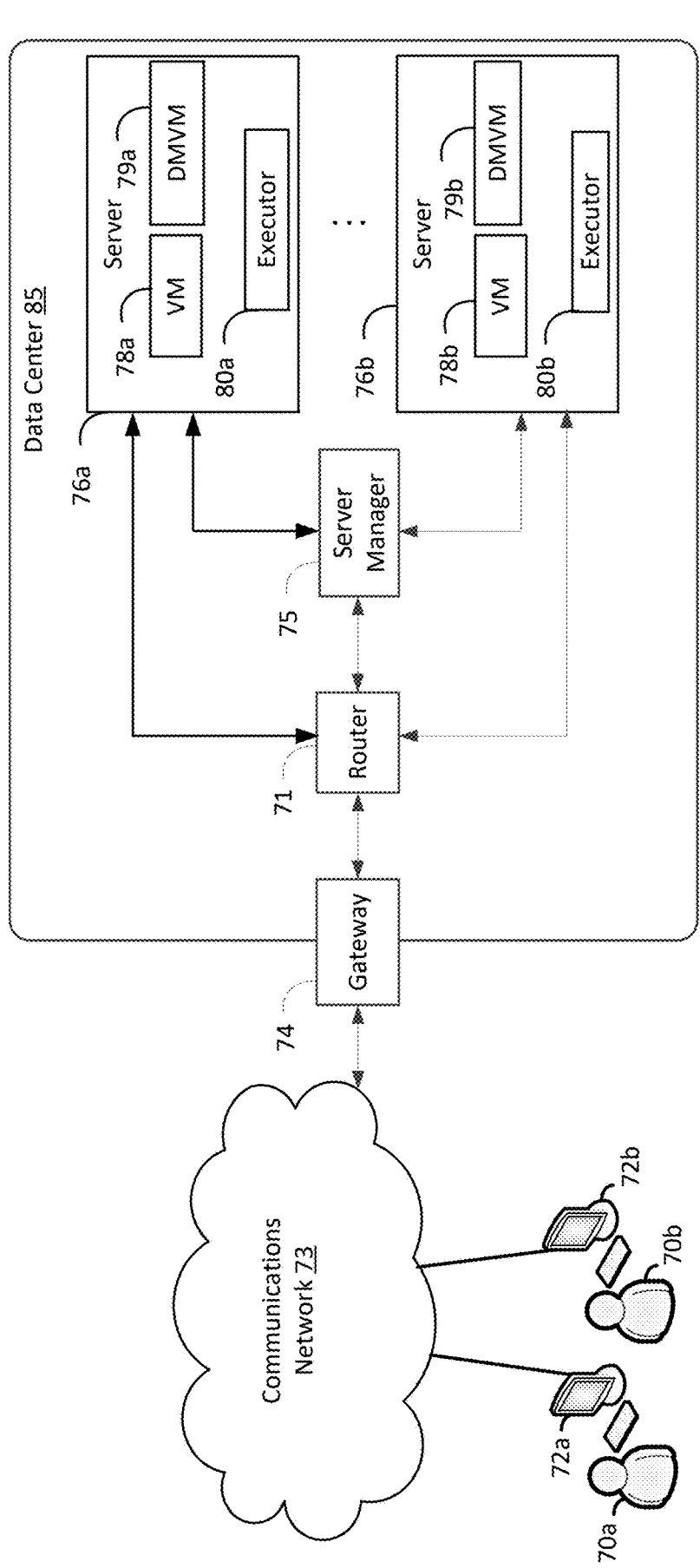
FIG. 9 is a diagram illustrating an example system for transmitting and providing data that may be used in accordance with the present disclosure.

An example system for transmitting and providing data will now be described in detail. In particular, FIG. 9 illustrates an example computing environment in which the embodiments described herein may be implemented. FIG. 9 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76*a* and 76*b* (which may be referred herein singularly as server 76 or in the plural as servers 76) that provide computing resources. These resources may be available as bare metal resources or as virtual machine instances 78*a-b* (which may be referred herein singularly as virtual machine instance 78 or in the plural as virtual machine instances 78). In this example, the resources also include distribution and modification virtual machines (DMVM's) 79*a-b*, which are virtual machines that are configured to execute any, or all, of the dynamic messaging group distribution and modification techniques described above.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 9, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72*a* or 72*b* may be a server, a desktop or laptop personal computer, a tablet computer, a wireless telephone, a personal digital assistant (PDA), an e-book reader, a game console, a set-top box or any other computing device capable of accessing data center 85. User computer 72*a* or 72*b* may connect directly to the Internet (e.g., via a cable modem or a Digital Subscriber Line (DSL)). Although only two user computers 72*a* and 72*b* are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 9 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80*a* or 80*b* (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 9, a router 71 may be utilized to interconnect the servers 76*a* and 76*b*. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 9, a server manager 75 is also employed to at least in part direct various communications to, from and/or between servers 76*a* and 76*b*. While FIG. 9 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 9 has been greatly simplified and that many more networks and networking devices may be utilized to interconnect the various computing systems disclosed herein. These network topologies and devices should be apparent to those skilled in the art.

It should also be appreciated that data center 85 described in FIG. 9 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 10:
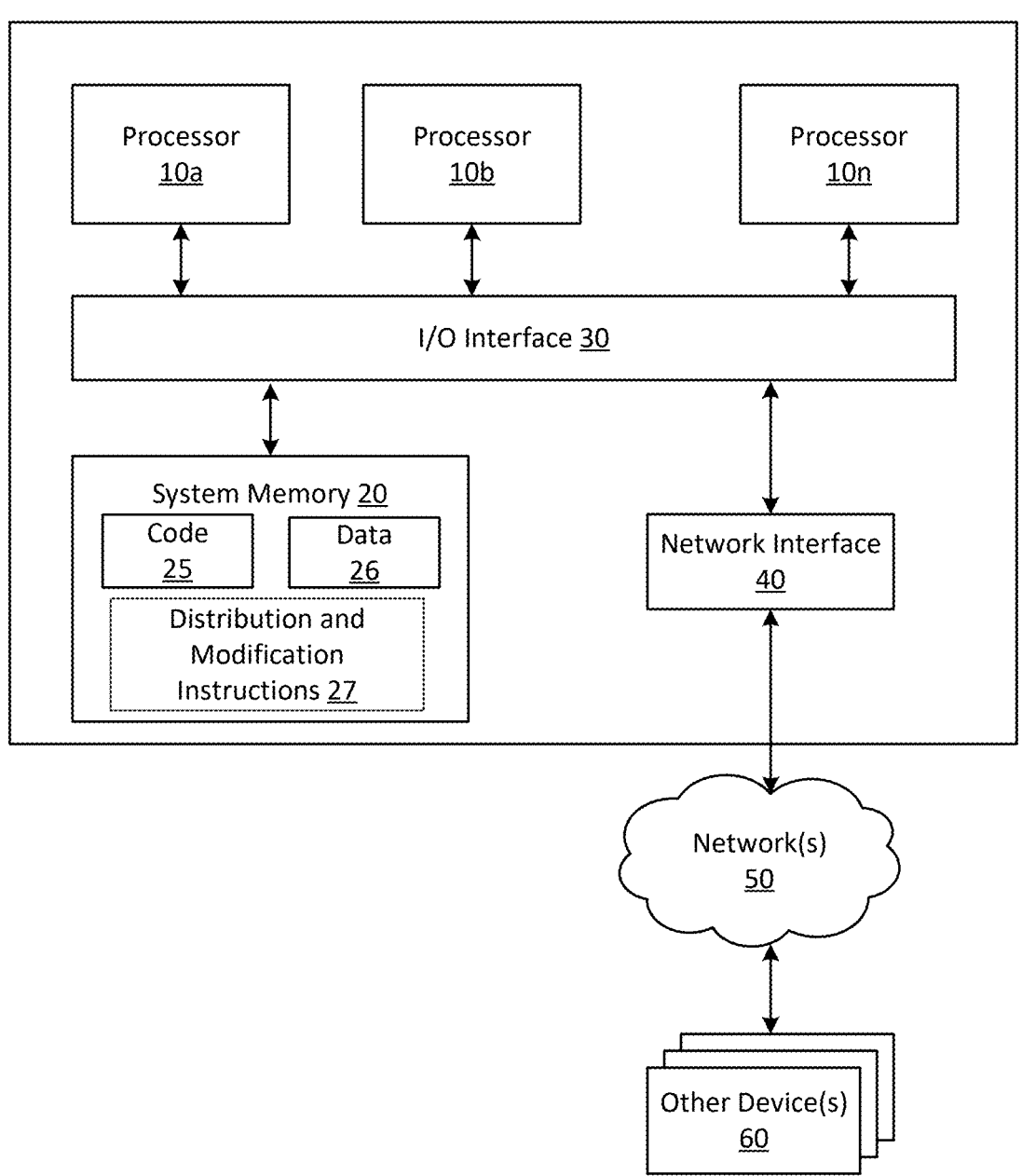
FIG. 10 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 10 depicts a computer system that includes or is configured to access one or more computer-accessible media. In the illustrated embodiment, computing device 15 includes one or more processors 10*a*, 10*b* and/or 10*n* (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26. Additionally, in this example, system memory 20 includes distribution and modification instructions 27, which are instructions for executing any, or all, of the dynamic messaging group distribution and modification techniques described above.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability container of a resource instance is intended to be independent of the availability container of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:

one or more processors; and one or more memories having stored therein instructions that, upon execution by the one or more processors, cause the computing system to perform computing operations comprising:

receiving first participant information associated with a set of participants that participate in an event;

distributing, based at least in part on one or more user-selectable participant distribution criteria and the first participant information, the set of participants across a plurality of messaging groups to form a first participant distribution, wherein each messaging group of the plurality of messaging groups has a respective participant subset of the set of participants, and wherein messages sent by participants within the respective participant subset are delivered only to other participants within the respective participant subset;

receiving, during the event, second participant information associated with the set of participants, wherein the second participant information comprises one or more updates to the first participant information; and modifying, during the event, based at least in part on the one or more user-selectable participant distribution criteria and the second participant information, the first participant distribution to form a modified participant distribution, wherein the modifying of the first participant distribution comprises: identifying a second messaging group of the plurality of messaging groups having a message transmission rate below a predetermined threshold: selecting an existing participant from a first messaging group; and moving the existing participant from the first messaging group to the second messaging group based at least in part on the message transmission rate of the second messaging group being below the predetermined threshold.

2. The computing system of claim 1, wherein the first and the second participant information comprise at least one of a total quantity of participants in the set of participants, a quantity of participants within each messaging group, or a quantity of participants that are leaving or joining the event.

3. The computing system of claim 1, wherein the first and the second participant information comprise participant activity information indicating a participant activity level of one or more participants.

4. The computing system of claim 1, wherein the one or more user-selectable participant distribution criteria comprise at least one of a minimum participant quantity per messaging group, a maximum participant quantity per messaging group, a maximum messaging group quantity, a minimum messaging group quantity, or a minimum time in messaging group.

5. The computing system of claim 1, wherein the one or more user-selectable participant distribution criteria comprise weighted activity criteria relating to participant activity levels.

6. A computer-implemented method comprising:

receiving first participant information associated with a set of participants that participate in an event;

distributing, based at least in part on one or more user-selectable participant distribution criteria and the first participant information, the set of participants across a plurality of messaging groups to form a first participant distribution, wherein each messaging group of the plurality of messaging groups has a respective participant subset of the set of participants, and wherein messages sent by participants within the respective participant subset are delivered only to other participants within the respective participant subset;

receiving, during the event, second participant information associated with the set of participants, wherein the second participant information comprises one or more updates to the first participant information; and modifying, during the event, based at least in part on the one or more user-selectable participant distribution criteria and the second participant information, the first participant distribution to form a modified participant distribution, wherein the modifying of the first participant distribution comprises: identifying a second messaging group of the plurality of messaging groups having a message transmission rate below a predetermined threshold;

selecting an existing participant from a first messaging group; and moving the existing participant from the first messaging group to the second messaging group based at least in part on the message transmission rate of the second messaging group being below the predetermined threshold.

7. The computer-implemented method of claim 6, wherein the modifying of the first participant distribution further comprises adding a new participant to the first messaging group.

8. The computer-implemented method of claim 6, wherein the modifying of the first participant distribution further comprises at least one of adding a new messaging group to the plurality of messaging groups or removing an existing messaging group from the plurality of messaging groups.

9. The computer-implemented method of claim 6, wherein the first and the second participant information comprise at least one of a total quantity of participants in the set of participants, a quantity of participants within each messaging group, or a quantity of participants that are leaving or joining the event.

10. The computer-implemented method of claim 6, wherein the first and the second participant information comprise participant activity information indicating a participant activity level of one or more participants.

11. The computer-implemented method of claim 6, wherein the one or more user-selectable participant distribution criteria comprise at least one of a minimum participant quantity per messaging group, a maximum participant quantity per messaging group, a maximum messaging group quantity, a minimum messaging group quantity, or a minimum time in messaging group.

12. The computer-implemented method of claim 6, wherein the one or more user-selectable participant distribution criteria comprise weighted activity criteria relating to participant activity levels.

13. One or more non-transitory computer-readable storage media having stored thereon computing instructions that, upon execution by one or more computing devices, cause the one or more computing devices to perform computing operations comprising:

receiving first participant information associated with a set of participants that participate in an event;

distributing, based at least in part on one or more user-selectable participant distribution criteria and the first participant information, the set of participants across a plurality of messaging groups to form a first participant distribution, wherein each messaging group of the plurality of messaging groups has a respective participant subset of the set of participants, and wherein messages sent by participants within the respective participant subset are delivered only to other participants within the respective participant subset;

receiving, during the event, second participant information associated with the set of participants, wherein the second participant information comprises one or more updates to the first participant information; and modifying, during the event, based at least in part on the one or more user-selectable participant distribution criteria and the second participant information, the first participant distribution to form a modified participant distribution, wherein the modifying of the first participant distribution comprises: identifying a second messaging group of the plurality of messaging groups having a message transmission rate below a predetermined threshold;

selecting an existing participant from a first messaging group; and moving the existing participant from the first messaging group to the second messaging group based at least in part on the message transmission rate of the second messaging group being below the predetermined threshold.

14. The one or more non-transitory computer-readable storage media of claim 13, wherein the modifying of the first participant distribution further comprises adding a new participant to the first messaging group.

15. The one or more non-transitory computer-readable storage media of claim 13, wherein the modifying of the first participant distribution further comprises at least one of adding a new messaging group to the plurality of messaging groups or removing an existing messaging group from the plurality of messaging groups.

16. The one or more non-transitory computer-readable storage media of claim 13, wherein the first and the second participant information comprise at least one of a total quantity of participants in the set of participants, a quantity of participants within each messaging group, or a quantity of participants that are leaving or joining the event.

17. The one or more non-transitory computer-readable storage media of claim 13, wherein the one or more user-selectable participant distribution criteria comprise at least one of a minimum participant quantity per messaging group, a maximum participant quantity per messaging group, a maximum messaging group quantity, a minimum messaging group quantity, or a minimum time in messaging group.

18. The one or more non-transitory computer-readable storage media of claim 13, wherein the one or more user-selectable participant distribution criteria comprise weighted activity criteria relating to participant activity levels.

19. The one or more non-transitory computer-readable storage media of claim 13, wherein the first and the second participant information comprise participant activity information indicating a participant activity level of one or more participants.

* * * * *